US012750844B2

(12) United States Patent
Xiong

(10) Patent No.: US 12,750,844 B2
(45) Date of Patent: Sep. 29, 2026

(54) CONFIGURED GRANT BASED SMALL DATA TRANSMISSION (CG-SDT) IN RRC INACTIVE STATE

(71) Applicant: Intel Corporation, Santa Clara, CA (US)

(72) Inventor: Gang Xiong, Beaverton, OR (US)

(73) Assignee: Intel Products IP LLC, Santa Clara, CA (US)

( * ) Notice: Subject to any disclaimer, the term of this patent is extended or adjusted under 35 U.S.C. 154(b) by 138 days.

(21) Appl. No.: 18/280,098

(22) PCT Filed: Mar. 21, 2022

(86) PCT No.: PCT/US2022/021171
§ 371 (c)(1),
(2) Date: Sep. 1, 2023

(87) PCT Pub. No.: WO2022/212104
PCT Pub. Date: Oct. 6, 2022

(65) Prior Publication Data

US 2024/0163868 A1 May 16, 2024

Related U.S. Application Data

(60) Provisional application No. 63/284,561, filed on Nov. 30, 2021, provisional application No. 63/250,161,
(Continued)

(51) Int. Cl.
*H04W 72/1268* (2023.01)
*H04B 7/06* (2006.01)
(Continued)

(52) U.S. Cl.
CPC .... *H04W 72/1268* (2013.01); *H04B 7/06968* (2023.05); *H04L 5/0051* (2013.01); *H04W 72/232* (2023.01); *H04W 76/20* (2018.02)

(58) Field of Classification Search
CPC ... H04L 5/0051; H04L 5/0023; H04L 5/0044; H04L 5/0053; H04L 5/0094;
(Continued)

(56) References Cited

U.S. PATENT DOCUMENTS

2019/0229847 A1* 7/2019 Yoshimura .......... H04L 27/2649
2021/0022143 A1 1/2021 Xiong et al.
(Continued)

FOREIGN PATENT DOCUMENTS

| | | |
|---|---|---|
| CN | 116965135 | 10/2023 |
| JP | 7610029 | 12/2024 |
| WO | WO-2022212104 A1 | 10/2022 |

OTHER PUBLICATIONS

"Discussion on RANI impacts for small data transmission", Vivo , R1-2101159, 3GPP TSG RAN WG1 #104-e, e-Meeting, (Jan. 18, 2021).
(Continued)

*Primary Examiner* — Jianye Wu
(74) *Attorney, Agent, or Firm* — Schwegman Lundberg & Woessner, P.A.

(57) ABSTRACT

A user equipment (UE) configured for multi-beam operation in a fifth-generation new radio (5G-NR) system may decode a physical downlink control channel (PDCCH). When a DCI format for a configured grant (CG) based small data transmission (SDT) (CG-SDT) is detected and a transport block (TB) is received in a corresponding physical downlink shared channel (PDSCH), the UE may assume that a demodulation reference signal (DM-RS) antenna port associated with PDCCH receptions and a DM-RS antenna port associated with PDSCH receptions are quasi co-located (QCL) with a synchronization signal/physical broadcast channel (SS/PBCH) associated with a physical uplink shared channel (PUSCH) resource for the CG-SDT. During the
(Continued)

CG-SDT, the UE may encode a PUCCH for transmission using a same spatial domain transmission filter as a last PUSCH transmission.

15 Claims, 10 Drawing Sheets

Related U.S. Application Data filed on Sep. 29, 2021, provisional application No. 63/181,067, filed on Apr. 28, 2021, provisional application No. 63/169,602, filed on Apr. 1, 2021.

(51) Int. Cl.
*H04L 5/00* (2006.01)
*H04W 72/232* (2023.01)
*H04W 76/20* (2018.01)

(58) Field of Classification Search
CPC ........... H04W 72/1268; H04W 72/232; H04W 76/20; H04W 76/27; H04W 56/0045; H04B 7/06968
See application file for complete search history.

(56) References Cited

U.S. PATENT DOCUMENTS

2021/0045085 A1 2/2021 Islam
2022/0295540 A1* 9/2022 Tsai .................. H04W 72/1273

OTHER PUBLICATIONS

"International Application Serial No. PCT/US2022/021171, International Search Report mailed Jun. 30, 2022", 4 pgs.
"International Application Serial No. PCT/US2022/021171, Written Opinion mailed Jun. 30, 2022", 5 pgs.
"Summary on the physical layer aspects of small data transmission", Moderator(ZTE), R1-2102076, 3GPP TSG-RAN WG1 Meeting #104-e, e-Meeting, (Feb. 5, 2021).
Huawei, et al., "RA and CG based small data transmission", R1-2101267, 3GPP TSG RAN WG1 Meeting #104-e, E-meeting, (Jan. 19, 2021).
"International Application Serial No. PCT US2022 021171, International Preliminary Report on Patentability mailed Oct. 12, 2023", 7 pgs.

* cited by examiner

CONFIGURED GRANT BASED SMALL DATA TRANSMISSION (CG-SDT) IN RRC INACTIVE STATE

PRIORITY CLAIMS

This application is a U.S. National Stage Filing under 35 U.S.C. 371 from International Application No. PCT/US2022/021171, filed Mar. 21, 2022 and published in English as WO 2022/212104 on Oct. 6, 2022, which claims priority to U.S. Provisional Patent Application Ser. No. 63/169,602, filed Apr. 1, 2021, U.S. Provisional Patent Application Ser. No. 63/181,067, filed Apr. 28, 2021, U.S. Provisional Patent Application Ser. No. 63/250,161, filed Sep. 29, 2021, and U.S. Provisional Patent Application Ser. No. 63/284,561, filed Nov. 30, 2021, which are incorporated herein by reference in their entireties.

TECHNICAL FIELD

Embodiments pertain to wireless communications. Some embodiments relate to wireless networks including 3GPP (Third Generation Partnership Project) and fifth-generation (5G) networks including 5G new radio (NR) (or 5G-NR) networks. Some embodiments relate to sixth-generation (6G) networks. Some embodiments relate to configured grant (CG) based small data transmission (SDT) (CG-SDT).

BACKGROUND

Mobile communications have evolved significantly from early voice systems to today's highly sophisticated integrated communication platform. With the increase in different types of devices communicating with various network devices, usage of 3GPP 5G NR systems has increased. The penetration of mobile devices (user equipment or UEs) in modern society has continued to drive demand for a wide variety of networked devices in many disparate environments. 5G NR wireless systems are forthcoming and are expected to enable even greater speed, connectivity, and usability, and are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

One issue with configured grant (CG) based small data transmission (SDT) (CG-SDT) is multi-beam operation.

DETAILED DESCRIPTION

Figure 1A:
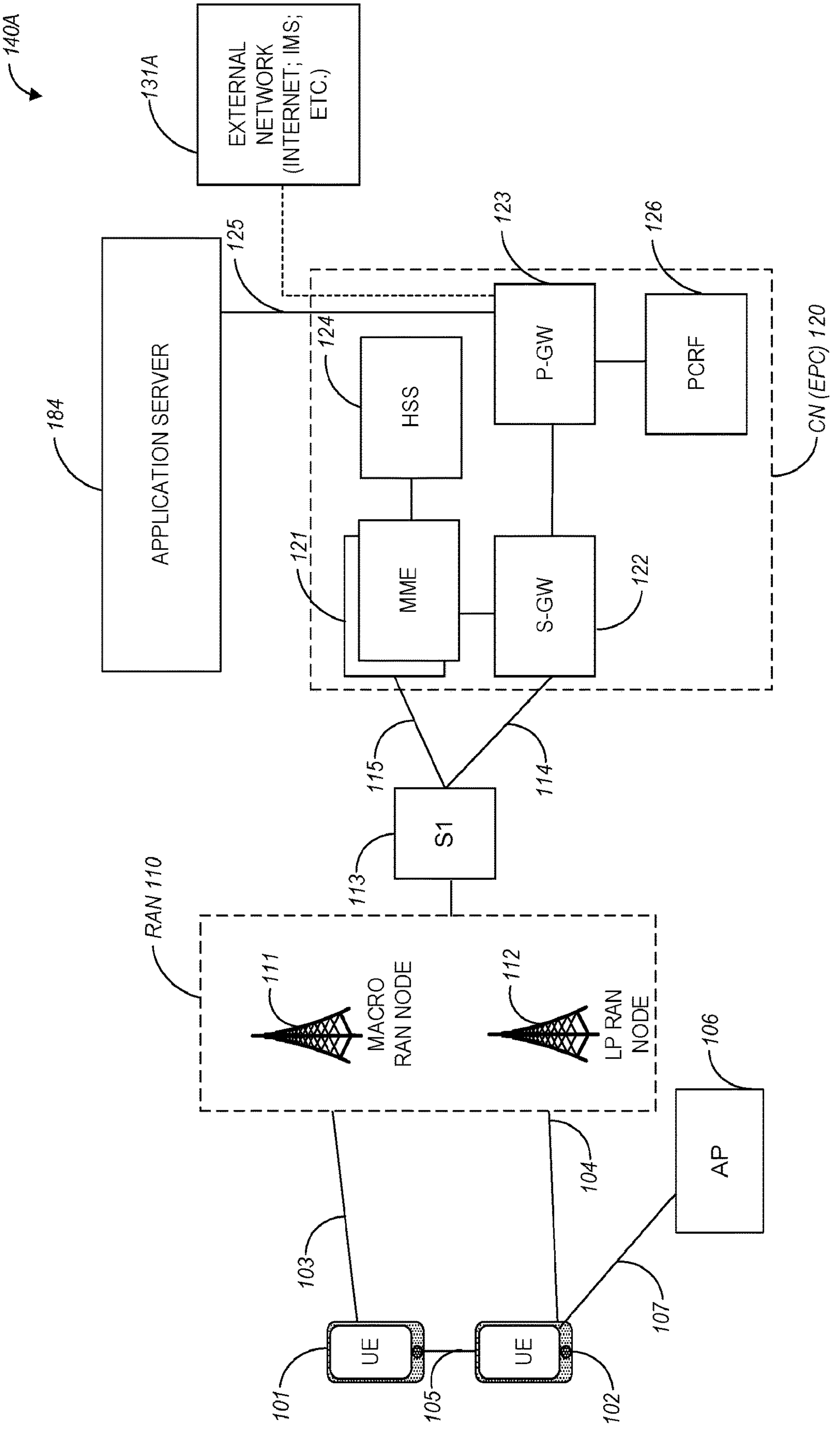
FIG. 1A illustrates an architecture of a network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some emboldens are directed to quasi co-located (QCL) assumptions for PDCCH/PDSCH transmission during CG-SDT operation. These embodiments are described in more detail below. Two antenna ports are said to be quasi co-located if properties of the channel over which a symbol on one antenna port is conveyed can be inferred from the channel over which a symbol on the other antenna port is conveyed.

Some embodiments are directed to a user equipment (UE) configured for multi-beam operation in a fifth-generation new radio (5G-NR) system. In these embodiments, the UE is configured to decode a physical downlink control channel (PDCCH). When a DCI format for a configured grant (CG) based small data transmission (SDT) (CG-SDT) is detected and a transport block (TB) is received in a corresponding physical downlink shared channel (PDSCH), the UE may assume that a demodulation reference signal (DM-RS) antenna port associated with PDCCH receptions and a DM-RS antenna port associated with PDSCH receptions are quasi co-located (QCL) with a synchronization signal/physical broadcast channel (SS/PBCH) associated with a physical uplink shared channel (PUSCH) resource for the CG-SDT. In these embodiments, during the CG-SDT, the UE may encode a PUCCH for transmission using a same spatial domain transmission filter as a last PUSCH transmission, although the scope of the embodiments is not limited in this respect. These embodiments are described in more detail below.

In these embodiments, a quasi co-location (QCL) relationship between downlink reference signals (e.g., a PDCCH, a PDSCH and a SS/PBCH) and a demodulation reference signal (DM-RS) port is assumed when a DCI format for a CG-SDT is detected. In these embodiments, for the QCL assumptions, a same TX beam is applied at the gNB for the transmission of SSB/PDCCH/PDSCH and associated DM-RS for PDSCH/PDCCH. In some embodiments, the last PUSCH transmission may be scheduled by a DCI. In some other embodiments, the last PUSCH transmission be a CG-PUSCH which is not scheduled by a DCI, although the scope of the embodiments is not limited in this respect.

In some embodiments, the DCI format that is detected comprises a DCI format 1_0 for a CG-SDT. In some of these embodiments, a QCL relationship between downlink reference signals (e.g., a PDCCH, a PDSCH and a SS/PBCH) and a demodulation reference signal (DM-RS) port is assumed when a DCI format 1_0 or DCI format 1_1 for a CG-SDT is detected. In some embodiments, the DCI format may include a cyclic redundancy check (CRC) scrambled by a Cell specific-Radio Network Temporary Identifier (C-RNTI) or scrambled by a RNTI, although the scope of the embodiments is not limited in this respect, although the scope of the embodiments is not limited in this respect.

In some embodiments, there is an association between SSB and CG-PUSCH resources. In some embodiments, the UE may decode a CG-PUSCH configuration that indicates a number of SS/PBCH block indexes to map to valid PUSCH occasions and associated DM-RS resources for transmission of the PUSCH. The UE may also map the number of SS/PBCH block indexes to the valid PUSCH occasions and associated DM-RS resources first in increasing order of a DM-RS port index and second in increasing order of a DM-RS sequence index, although the scope of the embodiments is not limited in this respect.

In some embodiments, when there is a set of PUSCH occasions and associated DM-RS resources that are not mapped to the SS/PBCH block indexes after an integer number of SS/PBCH block indexes to PUSCH occasions and associated DM-RS resources mapping cycles within the association period, the UE may refrain from further mapping the SS/PBCH block indexes to the set of PUSCH occasions and associated DM-RS resources. The UE may also refrain from using the PUSCH occasions and associated DM-RS resources of the set for any further PUSCH transmissions, although the scope of the embodiments is not limited in this respect.

In some embodiments, the association period is determined so that a pattern between the PUSCH occasions and associated DM-RS resources, and the SS/PBCH block indexes repeats at most every 640 msec, although the scope of the embodiments is not limited in this respect.

In some embodiments, the UE may also encode a PUSCH for transmission during the CG-SDT (CG-PUSCH). The CG-PUSCH may be a direct data transmission performed by the UE when operating in RRC_INACTIVE mode. In some embodiments, transmission of the PUSCH during the CG-SDT is a direct data transmission that is performed without an associated PRACH preamble transmission, although the scope of the embodiments is not limited in this respect. In these embodiments, a 4-step PRACH (Type 2) or 2-step RACH (Type 1) procedure may not need to be performed since the timing advance (TA) is either within the length of a cyclic prefix (CP) by the deployment or with little change, although the scope of the embodiments is not limited in this respect.

In some embodiments, the DM-RS antenna port associated with PDCCH receptions and the DM-RS antenna port associated with PDSCH receptions are assumed to be QCL with the SS/PBCH associated with the PUSCH with respect to average gain and Type D properties including a spatial receiver (RX) parameter, although the scope of the embodiments is not limited in this respect.

In some embodiments, the DM-RS antenna port associated with PDSCH receptions are assumed to be QCL with the SS/PBCH associated with the PUSCH with respect to Doppler shift, Doppler spread, average delay, delay spread (i.e., Type A properties), although the scope of the embodiments is not limited in this respect.

In some embodiments, based on the assumption that the DM-RS antenna port associated with PDCCH receptions and the DM-RS antenna port associated with PDSCH receptions are QCL with the SS/PBCH associated with the PUSCH resource for the CG-SDT, the UE may apply same receive (RX) beam parameters for synchronization signal block (SSB) receptions, PDCCH receptions and PDSCH receptions.

In some embodiments, to apply the same RX beam parameters, the UE may demodulate a PDSCH using a DM-RS based on the assumption that the DM-RS antenna port associated with PDSCH reception is QCL with the SS/PBCH associated with the PUSCH resource for the CG-SDT. The UE may also demodulate a PDCCH using a DM-RS based on the assumption that the DM-RS antenna port associated with PDCCH reception is QCL with the SS/PBCH associated with the PUSCH resource for the CG-SDT. In some of these embodiments, the same spatial receive filter (QCL Type D properties) may be applied for the SSB reception, PDCCH receptions and PDSCH receptions. In these embodiments, the UE would use a same Rx beam for SSB/PDCCH/PDSCH reception, although the scope of the embodiments is not limited in this respect.

Some embodiments are directed to a non-transitory computer-readable storage medium that stores instructions for execution by processing circuitry of a user equipment (UE) configured for multi-beam operation in a fifth-generation new radio (5G-NR) system. In these embodiments, the processing circuitry may decode a physical downlink control channel (PDCCH), and when a DCI format for a configured grant (CG) based small data transmission (SDT) (CG-SDT) is detected and a transport block (TB) is received in a corresponding physical downlink shared channel (PDSCH), the processing circuitry may assume that a demodulation reference signal (DM-RS) antenna port associated with PDCCH receptions and a DM-RS antenna port associated with PDSCH receptions are quasi co-located (QCL) with a synchronization signal/physical broadcast channel (SS/PBCH) associated with a physical uplink shared channel (PUSCH) resource for the CG-SDT. In these embodiments, during the CG-SDT, the processing circuitry may encode a PUCCH for transmission using a same spatial domain transmission filter as a last PUSCH transmission, although the scope of the embodiments is not limited in this respect.

Some embodiments are directed to gNodeB (gNB) configured for operation in a fifth-generation new radio (5G-NR) system. In these embodiments, for a user equipment (UE) configured for multi-beam operation, the gNB may encode a physical downlink control channel (PDCCH) transmission and may encode a physical downlink shared channel (PDSCH) transmission comprising a transport block (TB) for transmission to the UE. In these embodiments, the PDCCH transmission may be encoded to carry a DCI format for a configured grant (CG) based small data transmission (SDT) (CG-SDT) for detection by the UE along with the TB. In these embodiments, the gNB may configure a demodulation reference signal (DM-RS) antenna port associated with PDCCH transmission and a DM-RS antenna port associated with PDSCH transmission to be quasi co-located (QCL) with a synchronization signal/physical broadcast channel (SS/PBCH) associated with a physical uplink shared channel (PUSCH) resource for the CG-SDT. In these embodiments, the gNB may decode a PUCCH during the CG-SDT transmitted by the UE. The UE may use a same spatial domain transmission filter as a last PUSCH transmission. In these embodiments, to decode the PUCCH during the CG-SDT, the gNB may assume the UE used a same spatial domain transmission filter as a last PUSCH transmission, although the scope of the embodiments is not limited in this respect.

In some embodiments, the gNB may encode a CG-PUSCH configuration that indicates a number of SS/PBCH block indexes to map to valid PUSCH occasions and associated DM-RS resources for transmission of the PUSCH. The number of SS/PBCH block indexes may be mapped to the valid PUSCH occasions and associated DM-RS resources first in increasing order of a DM-RS port index and second in increasing order of a DM-RS sequence index, although the scope of the embodiments is not limited in this respect.

In some embodiments, the gNB may determine an association period so that a pattern between PUSCH occasions and associated DM-RS resources, and the SS/PBCH block indexes repeats at most every 640 msec, although the scope of the embodiments is not limited in this respect.

FIG. 1A illustrates an architecture of a network in accordance with some embodiments. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some embodiments, carrier aggregation may be used where one or more component carriers operate on unlicensed frequencies.

Embodiments described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Embodiments described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some embodiments, any of the UEs 101 and 102 can comprise an Internet-of-Things (IoT) UE or a Cellular IoT (CIoT) UE, which can comprise a network access layer designed for low-power IoT applications utilizing short-lived UE connections. In some embodiments, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some embodiments, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some embodiments, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro-RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In embodiments, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility embodiments in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some embodiments, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some embodiments, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some embodiments, the gNBs and the NG-eNBs can be connected to the AMF by NG-C interfaces, and to the UPF by NG-U interfaces. The gNBs and the NG-eNBs can be coupled to each other via Xn interfaces.

In some embodiments, the NG system architecture can use reference points between various nodes as provided by 3GPP Technical Specification (TS) 23.501 (e.g., V15.4.0, 2018-12). In some embodiments, each of the gNBs and the NG-eNBs can be implemented as a base station, a mobile edge server, a small cell, a home eNB, and so forth. In some embodiments, a gNB can be a master node (MN) and NG-eNB can be a secondary node (SN) in a 5G architecture.

Figure 1B:
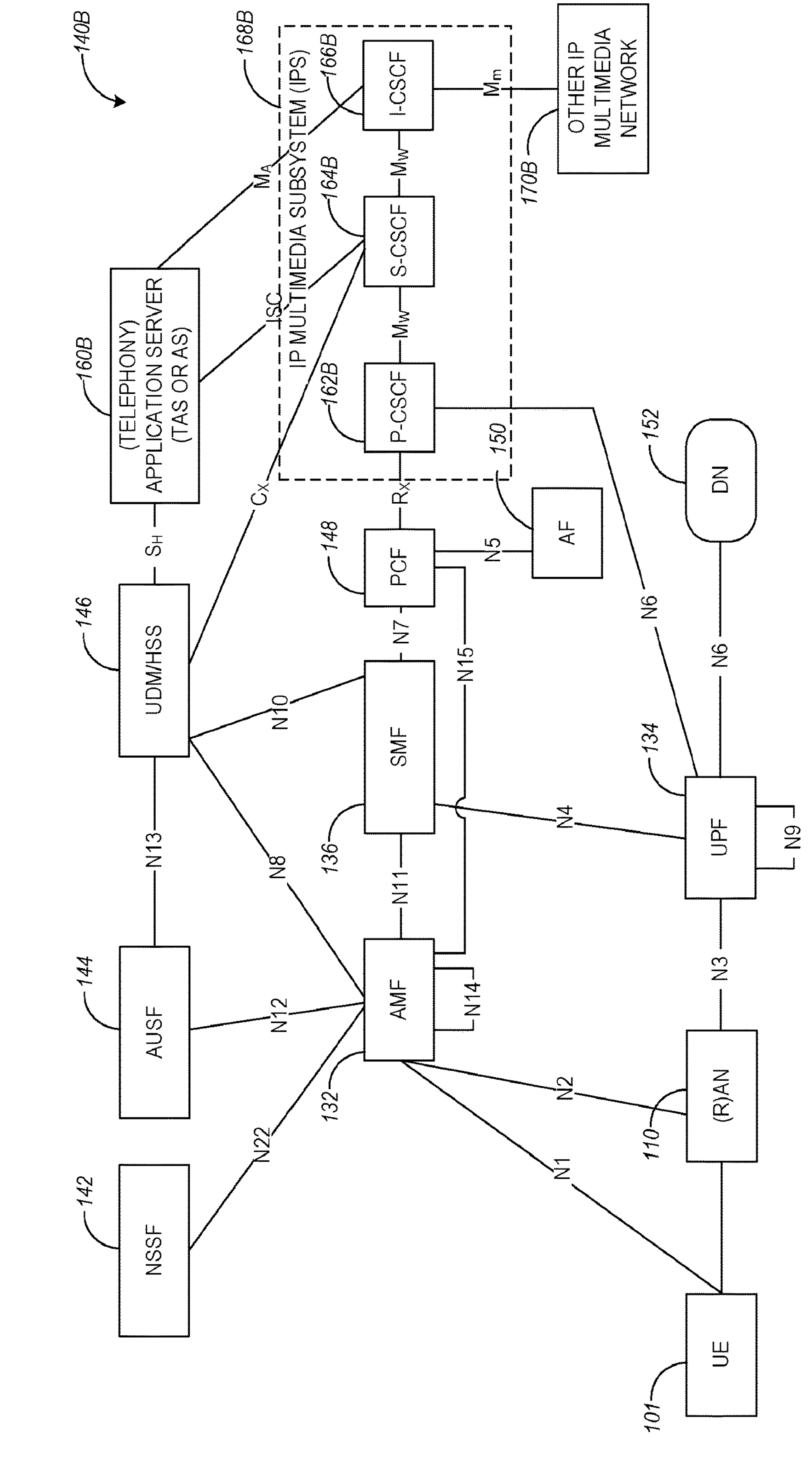
FIG. 1B and FIG. 1C illustrate a non-roaming 5G system architecture in accordance with some embodiments.

FIG. 1B illustrates a non-roaming 5G system architecture in accordance with some embodiments. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some embodiments, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain embodiments of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some embodiments, the I-CSCF 166B can be connected to another IP multimedia network 170E, e.g. an IMS operated by a different network operator.

In some embodiments, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SWIFs, not shown), and N22 (between AMF 132 and NSSF 142, not shown). Other reference point representations not shown in FIG. 1B can also be used.

Figure 1C:
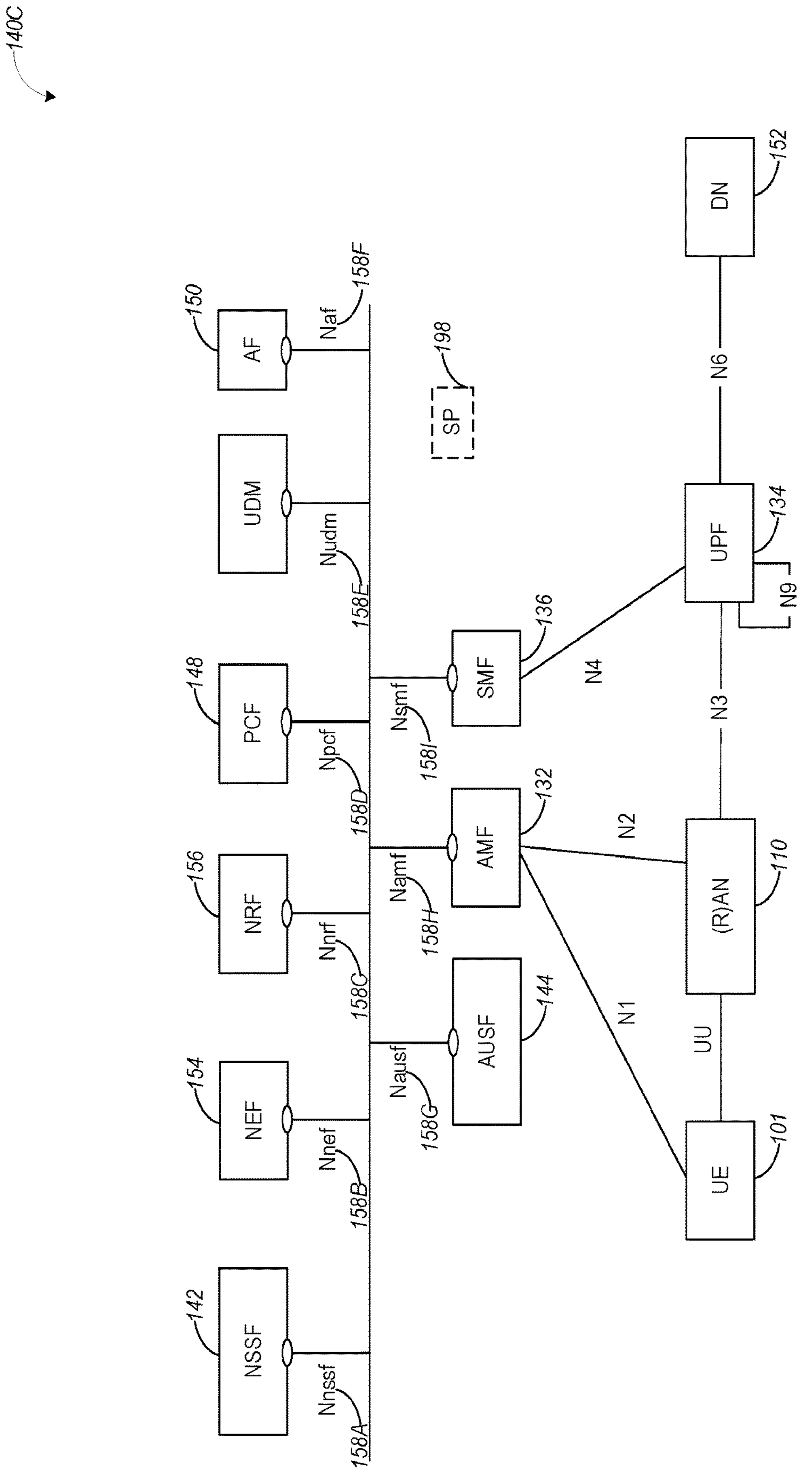

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some embodiments, 5G system architectures can be service-based and interaction between network functions can be represented by corresponding point-to-point reference points Ni or as service-based interfaces.

In some embodiments, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 1581 (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

In some embodiments, any of the UEs or base stations described in connection with FIGS. 1A-1C can be configured to perform the functionalities described herein.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that targets to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people's lives with better, simple, and seamless wireless connectivity solutions. NR will enable everything connected by wireless and deliver fast, rich content and services.

Rel-15 NR systems are designed to operate on the licensed spectrum. The NR-unlicensed (NR-U), a shorthand notation of the NR-based access to unlicensed spectrum, is a technology that enables the operation of NR systems on the unlicensed spectrum.

Figure 2A:
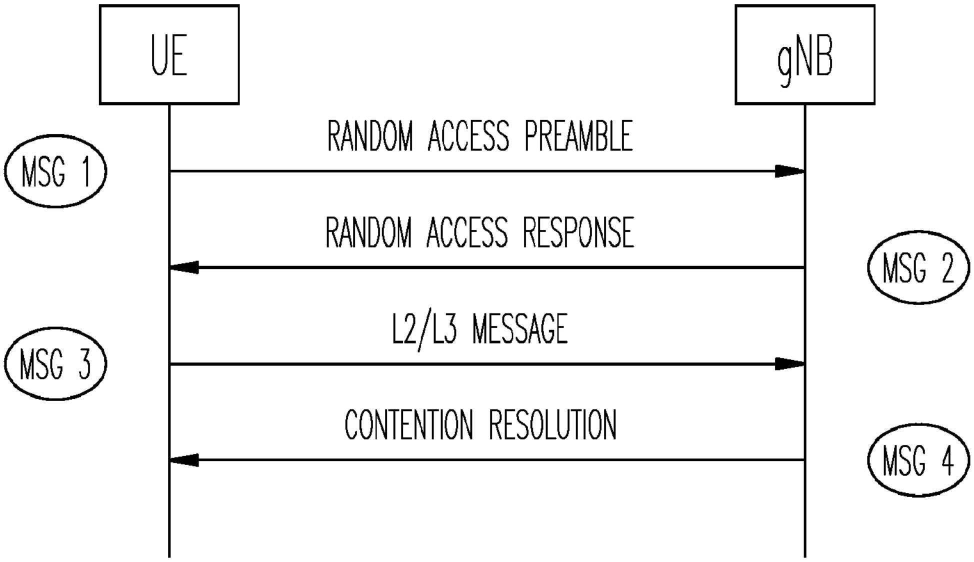
FIG. 2A illustrates a four-step RACH procedure, in accordance with some embodiments.

In Rel-15 NR, a 4-step random access (RACH) procedure was defined. As illustrated in FIG. 2A, in the first step, a UE transmits physical random access channel (PRACH) in the uplink by selecting one preamble signature. Subsequently, in the second step, the gNB feedbacks the random access response (RAR) which carries timing advanced (TA) command information and uplink grant for the uplink transmission. Further, in the third step, UE transmits Msg3 physical uplink shared channel (PUSCH) which may carry contention resolution ID. In the fourth step, the gNB sends the contention resolution message in physical downlink shared channel (PDSCH).

Figure 2B:
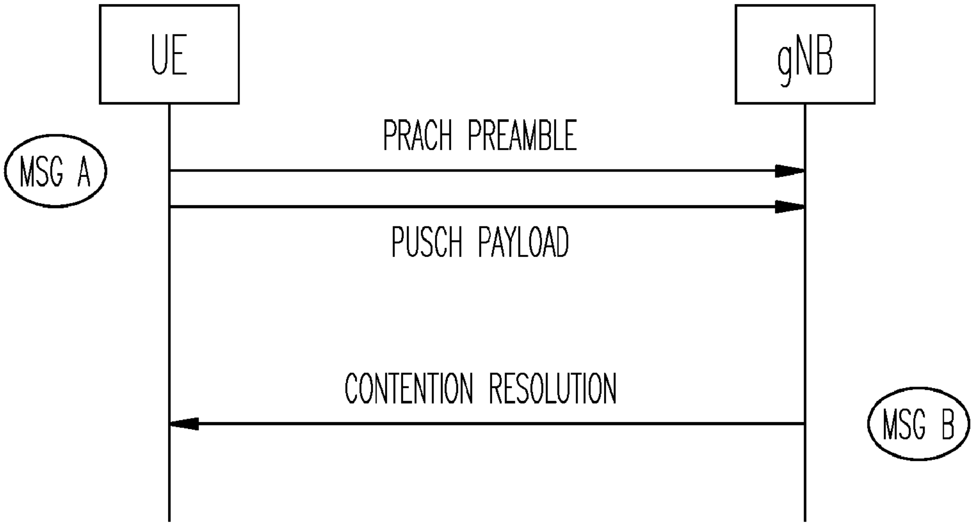
FIG. 2B illustrates a two-step RACH procedure, in accordance with some embodiments.

In Rel-16 NR, a 2-step RACH procedure was further defined, with the motivation to allow fast access and low latency uplink transmission. As illustrated in FIG. 2B, in the first step, UE transmits a PRACH preamble and associated MsgA PUSCH on a configured time and frequency resource, where MsgA PUSCH may carry at least equivalent contents of Msg3 in 4-step RACH. In the second step, after successful detection of PRACH preamble and decoding of MsgA PUSCH, gNB transmits MsgB which may carry equivalent contents of Msg2 and Msg4 in 4-step RACH.

Note that for certain scenarios, e.g., small cell network or industrial wireless sensor network (IWSN) where most of the sensors are stationary, PRACH preamble transmission in the 4-step PRACH or 2-step RACH procedure may not be needed since timing advance (TA) is either within the length of a cyclic prefix (CP) by the deployment or with little change.

In this case, direct data transmission on PUSCH within configured grant may be considered without associated PRACH preamble transmission, which can help reduce data transmission delay and save the UE power consumption. Moreover, for UEs in RRC_INACTIVE mode, small data transmission can be completed without moving into RRC CONNECTED mode, thereby saving state transition signaling overhead.

For configured grant based small data transmission (CG-SDT), in case of multiple beam operation, a set of synchronization signal blocks (SSB) may be configured for a UE so that UE may select one of SSBs which has reference signal received power (RSRP) larger than a threshold, and subsequently transmit the data on the CG-PUSCH resource which is associated with the selected SSB in accordance with the SSB to CG resource association. Further, multiple DL and UL transmissions can be allowed during CG-SDT. In this case, certain mechanisms may need to be defined for the beam management for the corresponding DL and UL transmissions in case of multi-beam operation. Among other things, embodiments of the present disclosure are directed to configured grant based small data transmission (CG-SDT) in multi-beam operation. In particular, some embodiments are directed to:

- Beam operation for multiple DL/UL transmission during CG-SDT and RACH based small data transmission (RA-SDT)
- Timing advance (TA) validation for CG-SDT
- Validation of PUSCH occasion in case of repetition for a CG-PUSCH resource for CG-SDT
- Configuration of association between SSB and CG-PUSCH resource Beam Operation for Multiple DL/UL Transmissions During CG-SDT and RA-SDT As mentioned above, for certain scenarios, e.g., small cell network or industrial wireless sensor network (IWSN) where most of the sensors are stationary, PRACH preamble transmission in the 4-step PRACH or 2-step RACH procedure may not be needed since timing advance (TA) is either within the length of a cyclic prefix (CP) by the deployment or with little change.

In this case, direct data transmission on physical uplink shared channel (PUSCH) within configured grant may be considered without associated physical random access (PRACH) preamble transmission, which can help reduce data transmission delay and save the UE power consumption. Moreover, for UEs in RRC_INACTIVE mode, small data transmission can be completed without moving into RRC CONNECTED mode, thereby saving state transition signaling overhead.

For configured grant based small data transmission (CG-SDT), in case of multiple beam operation, a set of synchronization signal blocks (SSB) may be configured for a UE so that UE may select one of SSBs which has reference signal received power (RSRP) larger than a threshold, and subsequently transmit the data on the CG-PUSCH resource which is associated with the selected SSB in accordance with the SSB to CG resource association. Further, multiple DL and UL transmissions can be allowed during CG-SDT. In this case, certain mechanisms may need to be defined for the beam management for the corresponding DL and UL transmissions in case of multi-beam operation.

Embodiments of beam operation for multiple DL/UL transmissions during CG-SDT and random access-SDT (RA-SDT) are provided as follows:

In some embodiments, during CG-SDT, a UE transmits a PUSCH scheduled by a downlink control information (DCI) format 0_0 or 0_1 scrambled by the Cell specific-Radio Network Temporary Identifier (C-RNTI) or a RNTI configured for CG-SDT using a same spatial domain transmission filter in a same active UL bandwidth part (BWP) as a CG-PUSCH transmission.

In some other embodiments, during CG-SDT, a UE transmits a PUSCH scheduled by a DCI format 0_0 or 0_1 scrambled by the C-RNTI or a RNTI configured for CG-SDT using a same spatial domain transmission filter in a same active UL BWP as a last PUSCH or a PUCCH transmission carrying HARQ-ACK feedback of a corresponding or last PDSCH.

Figure 3:
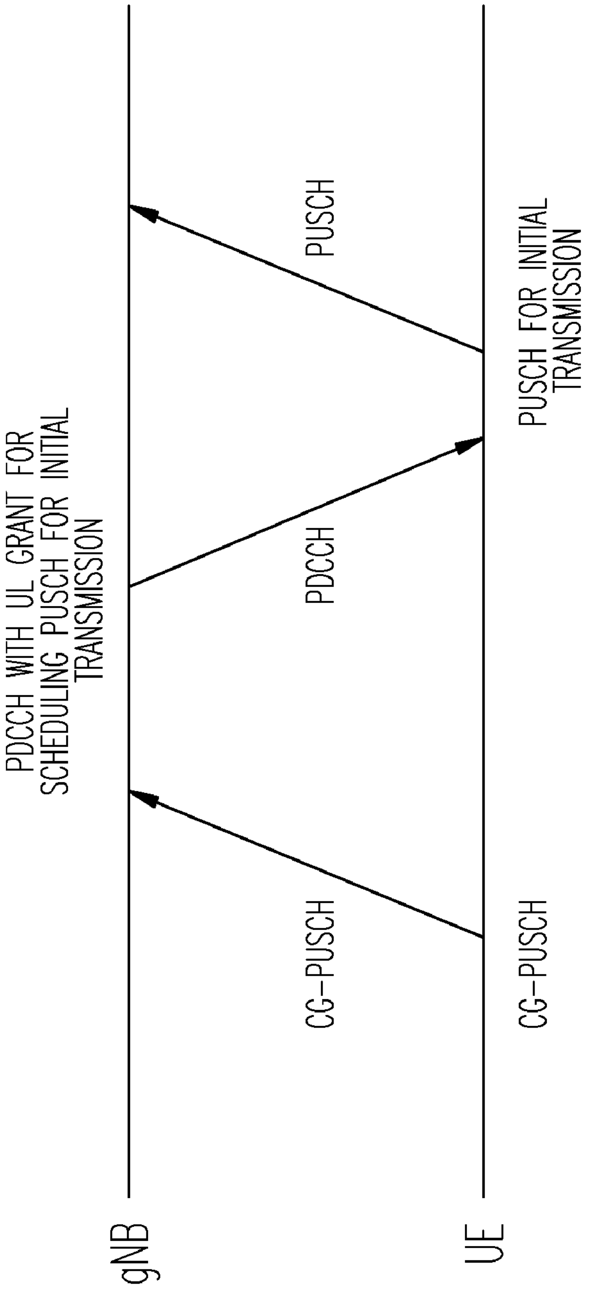
FIG. 3 illustrates beam operation in case of PUSCH initial transmission, in accordance with some embodiments.

FIG. 3 illustrates one example of beam operation in case of PUSCH initial transmission. In the example, after CG-PUSCH transmission, gNB may transmit a physical downlink control channel (PDCCH) with UL grant to schedule PUSCH with initial transmission. In this case, Tx beam used for PUSCH with initial transmission can be same as that of CG-PUSCH transmission.

Figure 4:
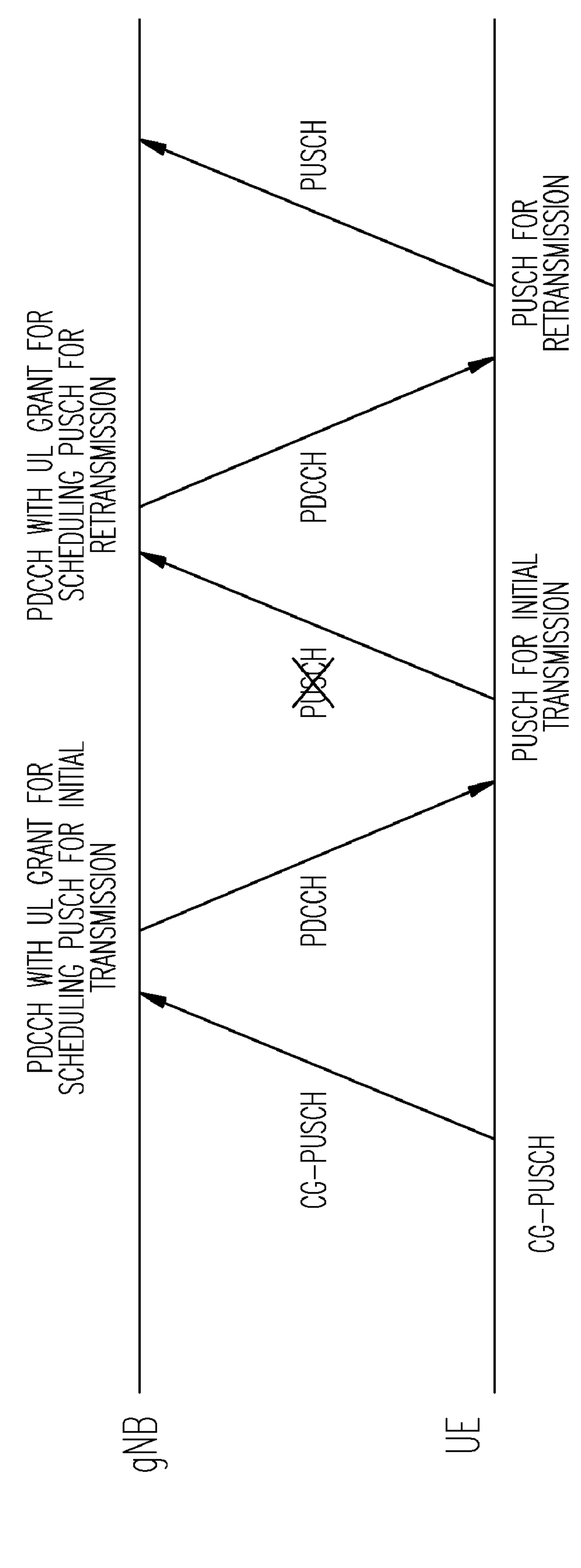
FIG. 4 illustrates beam operation in case of PUSCH retransmission, in accordance with some embodiments

FIG. 4 illustrates one example of beam operation in case of PUSCH retransmission. In the example, after CG-PUSCH transmission, gNB may transmit a PDCCH with UL grant to schedule PUSCH with initial transmission. However, gNB may not be able to decode PUSCH initial transmission successfully. Subsequently, gNB transmits a PDCCH with UL grant to schedule PUSCH retransmission. In this case, Tx beam used for PUSCH with retransmission can be same as that of PUSCH initial transmission or a last PUSCH transmission.

In another embodiment, during CG-SDT, if the UE detects a DCI format 1_0 or 1_1 with CRC scrambled by the C-RNTI or a RNTI configured for CG-SDT and receives a transport block in a corresponding physical downlink shared channel (PDSCH) or detects a DCI format 0_0 or 0_1 with CRC scrambled by the C RNTI or a RNTI configured for CG-SDT, the UE may assume same Demodulation reference signal (DM-RS) antenna port quasi co-location properties, as for a SSB block or a channel state information reference signal (CSI-RS) resource the UE used for CG-PUSCH association, regardless of whether or not the UE is provided Transmission Configuration Indicator (TCI)-State for the control resource set (CORESET) where the UE receives the PDCCH with the DCI format 1_0 or 1_1, respectively.

Further, during CG-SDT, a physical uplink control channel (PUCCH) carrying hybrid automatic repeat request-acknowledgement (HARQ-ACK) response of a PDSCH transmission is transmitted with a same spatial domain transmission filter in a same active UL BWP as a CG-PUSCH transmission.

In some other embodiments, during CG-SDT, PUCCH carrying HARQ-ACK response of a PDSCH transmission is transmitted with a same spatial domain transmission filter in a same active UL BWP as a last PUSCH transmission.

Note that only when timing advance timer (TAT) is not expired, UE can provide HARQ-ACK feedback of a PDSCH transmission on PUCCH during RA-SDT and CG-SDT.

Figure 5:
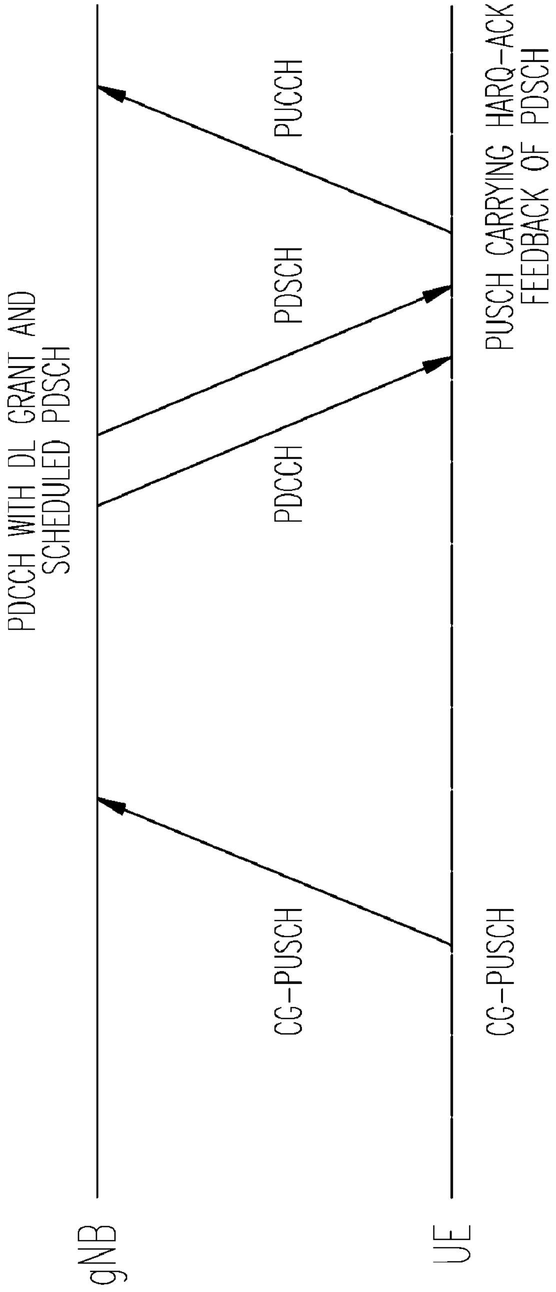
FIG. 5 illustrates beam operation in case of PDCCH/PDSCH and PUCCH transmission, in accordance with some embodiments

FIG. 5 illustrates one example of beam operation in case of PDCCH/PDSCH and PUCCH transmission. In the example, after CG-PUSCH transmission, gNB may transmit a PDCCH with DL grant and corresponding PDSCH. In this case, UE may assume same QCL assumption of PDCCH and corresponding PDSCH as for SSB used for CG-PUSCH association. Further, after successful decoding of PDSCH, UE may transmit a PUCCH carrying HARQ-ACK feedback of the PDSCH. In this case, the PUCCH may be transmitted with a same spatial domain transmission filter as CG-PUSCH transmission.

In another embodiment, during CG-SDT, a PDCCH with a DCI format 1_0 with CRC scrambled by the C-RNTI or a RNTI configured for CG-SDT may be used to carry HARQ-ACK feedback of corresponding CG-PUSCH transmission. In this case, UE may assume same DMRS antenna port quasi co-location properties, as for a SSB block or a CSI-RS resource the UE used for CG-PUSCH association, regardless of whether or not the UE is provided Transmission Configuration Indicator (TCI)-State for the control resource set (CORESET) where the UE receives the PDCCH with the DCI format 1_0 or 1_1, respectively.

In another embodiment, during RA-SDT, if the UE detects a DCI format 1_0 or 1_1 with CRC scrambled by the C-RNTI or a RNTI configured for RA-SDT and receives a transport block in a corresponding PDSCH or detects a DCI format 0_0 or 0_1 with CRC scrambled by the C RNTI or a RNTI configured for RA-SDT, the UE may assume same DM-RS antenna port quasi co-location properties, as for a SSB block or a CSI-RS resource the UE used for PRACH association, regardless of whether or not the UE is provided TCI-State for the CORESET where the UE receives the PDCCH with the DCI format 1_0 or 1_1, respectively.

In some other embodiments, if the UE detects a DCI format 1_0 or 1_1 with CRC scrambled by the C-RNTI or a RNTI configured for RA-SDT and receives a transport block in a corresponding PDSCH or detects a DCI format 0_0 or 0_1 with CRC scrambled by the C RNTI or a RNTI configured for RA-SDT, the UE may assume same DM-RS antenna port quasi co-location properties, as for PDCCH with a DCI format 1_0 with CRC scrambled by RA-RNTI or MsgB-RNTI, regardless of whether or not the UE is provided TCI-State for the CORESET where the UE receives the PDCCH with the DCI format 1_0 or 1_1, respectively.

Further, during RA-SDT, PUCCH carrying HARQ-ACK response of a PDSCH transmission is transmitted with a same spatial domain transmission filter in a same active UL BWP as a PUSCH transmission scheduled by a RAR or fallbackRAR UL grant for 4-step RACH and/or MsgA PUSCH for 2-step RACH or PUCCH with HARQ-ACK feedback of Msg4 or MsgB.

In some other embodiments, during RA-SDT, PUCCH carrying HARQ-ACK response of a PDSCH transmission is transmitted with a same spatial domain transmission filter in a same active UL BWP as a last PUSCH transmission.

In another embodiment, during RA-SDT, a UE transmits a PUSCH scheduled by a DCI format 0_0 or 0_1 scrambled by the C-RNTI or a RNTI configured for RA-SDT using a same spatial domain transmission filter in a same active UL BWP as a Msg3 PUSCH transmission scheduled by a RAR or fallbackRAR UL grant for 4-step RACH and/or MsgA PUSCH for 2-step RACH or PUCCH with HARQ-ACK feedback of Msg4 or MsgB.

In some other embodiments, a UE transmits a PUSCH scheduled by a DCI format 0_0 or 0_1 scrambled by the C-RNTI or RNTI configured for RA-SDT using a same spatial domain transmission filter in a same active UL BWP as a last PUSCH transmission or PUCCH transmission.

In another embodiment, during CG-SDT or RA-SDT, when beam failure recovery (BFR) is triggered by a UE, the existing mechanism can be applied for the Tx beam of PUSCH and PUCCH transmission for the subsequent data transmission. In particular, PUCCH carrying HARQ-ACK response of a PDSCH transmission is transmitted with a same spatial domain transmission filter in a same active UL BWP as a last PUSCH transmission or a PRACH transmission which is triggered by BFR.

Further, a UE transmits a PUSCH scheduled by a DCI format 0_0 or 0_1 scrambled by the C-RNTI or a RNTI configured for CG-SDT using a same spatial domain transmission filter in a same active UL BWP as a last PUSCH or a PUCCH transmission or a PRACH transmission which is triggered by BFR.

Timing Advance (TA) Validation for CG-SDT

Embodiments of TA validation for CG-SDT are provided as follows:

In some embodiments, a set of reference signal received power (RSRP) thresholds can be configured by higher layers via minimum system information (MSI), remaining minimum system information (RMSI), other system information (OSI) or dedicated radio resource control (RRC) signalling. In particular, this set of RSRP thresholds may include a RSRP increase threshold and a RSRP decrease threshold, e.g., UE can assume TA is valid when measured RSRP value does not increase more than the configured RSRP increase threshold or does not decrease more than the configured RSRP decrease threshold.

When a set of SSBs are configured by higher layers via RRC signalling for association with CG-PUSCH resource for a CG-PUSCH configuration, if measured RSRP value for a SSB within the set of SSBs does not increase more than the configured RSRP increase threshold or does not decrease more than the configured RSRP decrease threshold, UE can determine the TA is valid for the CG-PUSCH configuration; if measured RSRP value for any SSB within the set of SSBs increases more than the configured RSRP increase threshold or decreases more than the configured RSRP decrease threshold, UE can determine the TA is not valid for the CG-PUSCH configuration.

In another embodiment, two set of RSRP thresholds can be configured by higher layers via MSI, RMSI (SIB1), OSI or RRC signalling. In particular, one set of RSRP thresholds may include a RSRP increase threshold and a RSRP decrease threshold, e.g., UE can assume TA is valid when measured RSRP value does not increase more than the configured RSRP increase threshold or does not decrease more than the configured RSRP decrease threshold.

In addition, assuming the Tx beam used for the transmission of RRC release message is based on the SSB with index A, then if the newly detected SSB index for CG-PUSCH transmission is same as SSB index A, a first set of RSRP thresholds is used to determine whether TA is valid; while if the newly detected SSB index for CG-PUSCH transmission is different from the SSB index A, a second set of RSRP thresholds is used to determine whether TA is valid.

In another embodiment, two set of RSRP thresholds can be configured by higher layers via MSI, RMSI (SIB1), OSI or RRC signalling. Further, two groups of the SSBs can be configured by higher layers. When the newly detected SSB index for CG-PUSCH transmission is in a first group, a first set of RSRP thresholds is used to determine whether TA is valid; while if the newly detected SSB index for CG-PUSCH transmission is in a second group, a second set of RSRP thresholds is used to determine whether TA is valid.

Validation of PUSCH Occasion in Case of Repetition for a CG-PUSCH Resource for CG-SDT Embodiments of validation of PUSCH occasion in case of repetition for a CG-PUSCH resource for CG-SDT are provided as follows:

In some embodiments, the invalidation rule of PUSCH occasion for CG-SDT can be similar to that was defined for invalidation rule of PUSCH occasion for 2-step RACH, which is specified as in Section 8.1A in TS38.213 [1]. Further, a PUSCH occasion for CG-SDT is valid if it does not overlap in time and frequency with any PUSCH occasion for 2-step RACH or associated with a Type-2 random access procedure.

In another embodiment, when repetition is configured for CG-PUSCH resource, all repetitions of CG-PUSCH transmission are considered as a CG-PUSCH occasion. In this case, a same spatial domain transmission filter is used for all the repetitions of CG-PUSCH.

In another embodiment, when repetition is configured for CG-PUSCH resource, if a repetition in the CG-PUSCH resource does not satisfy the validation rule for CG-PUSCH occasion for CG-SDT, UE does not transmit CG-PUSCH in the repetition. In addition, a PUSCH occasion for CG-SDT is invalid only when all the repetitions are invalid.

Figure 6:
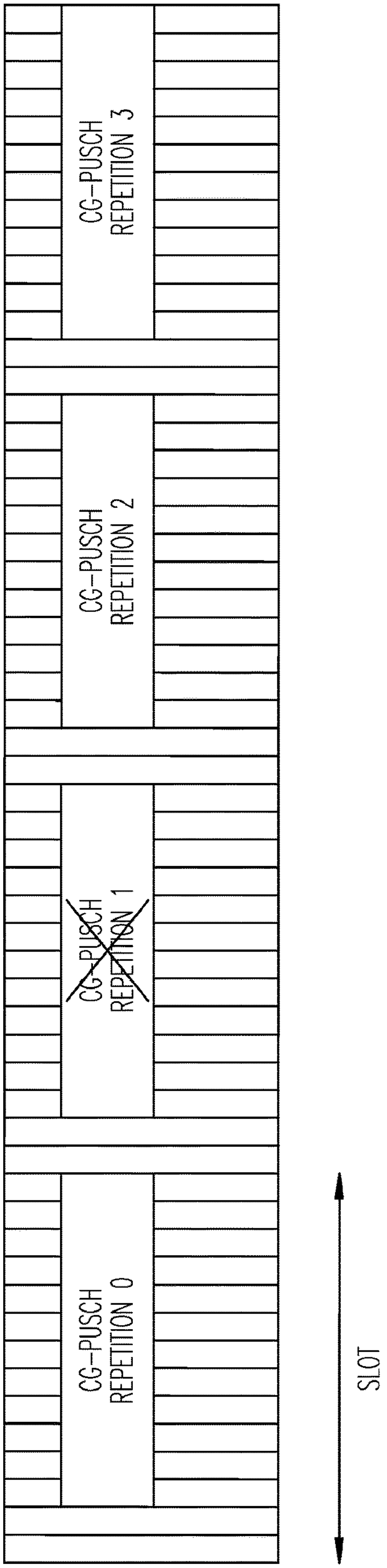
FIG. 6 illustrates validation of PUSCH occasion for CG-SDT when repetition is configured for a CG-PUSCH resource, in accordance with some embodiments

FIG. 6 illustrates one example of validation of PUSCH occasion for CG-SDT when repetition is configured for a CG-PUSCH resource. In the example, 4 repetitions are configured for a CG-PUSCH resource. Further, CG-PUSCH repetition #1 is not valid due to invalidation rule. In this case, UE does not transmit the second CG-PUSCH repetition, but still considers the CG-PUSCH occasion as valid.

In some other embodiments, a PUSCH occasion for CG-SDT is valid only when all the repetitions are valid. In this case, if any of the repetitions for CG-PUSCH does not satisfy the validation rule for CG-PUSCH occasion for CG-SDT, UE does not transmit CG-PUSCH with repetitions.

Configuration of the Association Between SSB and CG-PUSCH Resources

Embodiments of the configuration of association between SSB and CG-PUSCH resources are provided as follows:

In some embodiments, a list of SSB indexes can be configured as part of CG-PUSCH configuration, and a list of DMRS resources including DMRS APs and/or sequences for the configured CG-PUSCH can be associated with the list of SSB index, respectively. In particular, each DMRS resource may be associated with an SSB from the configured set of SSB indexes. In this case, the linkage between SSB and CG-PUSCH resources can be established by configuring a set of SSB indexes for a CG-PUSCH configuration. For CG-SDT operation, UE selects one of the SSBs with SS-RSRP change within the threshold and subsequently utilizes the associated CG-PUSCH resource for UL data transmission.

Note that when both DMRS AP and sequences are configured for DMRS resource, the ordering of DMRS resource index is determined first in an ascending order of a DMRS port index and second in an ascending order of a DMRS sequence index. The configuration of DMRS sequence can be defined similar to the DMRS sequence for MsgA PUSCH for 2-step RACH.

Further, in the configuration of association between SSB and CG-PUSCH resource, same or different SSBs may be associated with different CG-PUSCH resources or vice versa. When same SSB is associated with more than one CG-PUSCH resources, this can be viewed as one to many mapping between SSB and CG-PUSCH resource. When more than one SSBs are associated with one CG-PUSCH resource, this can be viewed as many to one mapping between SSB and CG-PUSCH resource.

Table 1 illustrates one example of association between SSB and CG-PUSCH resource within a CG-PUSCH configuration. In this case, a list of SSB indexes and DMRS APs can be configured. In the table, maxNrofSSBIndex is the number of SSB indexes for CG-SDT operation. Assuming 2 SSB indexes are configured for CG-SDT operation, the first SSB index is associated with the first DMRS AP, and the second SSB index is associated with the second DMRS AP.

TABLE 1

| Association between SSB and CG-PUSCH resource: Example 1 |
|---|
| Ssb-Index-List ::= SEQUENCE (SIZE(1..maxNrofSSBIndex)) OF SSB-Index<br>antennaPort-List ::= SEQUENCE (SIZE(1..maxNrofSSBIndex)) OF antennaPort |

Table 2 illustrates one example of association between SSB and CG-PUSCH resource within a CG-PUSCH configuration. In the table, maxNrofSSBIndex is the number of SSB indexes for CG-SDT operation. Further, one SSB index is associated with one DMRS AP.

TABLE 2

| Association between SSB and CG-PUSCH resource: Example 2 |
|---|
| assocationSSB-AntennaPortlist ::= SEQUENCE (SIZE(1..maxNrofSSBIndex)) OF assocationSSB-AntennaPort<br>assocationSSB-AntennaPort SEQUENCE {<br>antennaPort INTEGER (0..31),<br>associatedSSB, SSB-Index,<br>} |

Note that the above design principle can be straightforwardly extended to the case when more than one SSBs are associated with a CG-PUSCH resource, or when one SSB is associated with more than one CG-PUSCH resource. In this case, based on the number of configured SSB indexes and the number of CG-PUCSH resources including DMRS APs or sequences, UE can derive the mapping ratio between SSB and CG-PUSCH resource.

In one example, assuming 4 SSBs and 2 DMRS APs are configured for a CG-PUSCH configuration, then the mapping ratio is 2 to 1 mapping. In this case, first two SSB indexes are associated with first DMRS AP, while the second two SSB indexes are associated with second DMRS AP.

Figure 7:
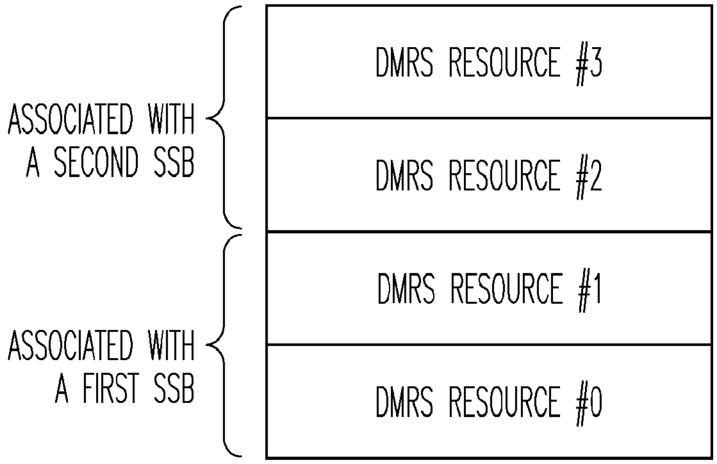
FIG. 7 illustrates an example of association between 2 SSBs and 4 DMRS resources, in accordance with some embodiments

In another example, assuming 1 SSBs and 4 DMRS resources are configured for a CG-PUSCH configuration, then the mapping ratio is 1 to 2 mapping. FIG. 7 illustrates one example of association between 2 SSBs and 4 DMRS resources. In the example, first SSB index is associated with first two DMRS resources, while the second SSB index is associated with second two DMRS resources.

In another embodiment, a mapping ratio is defined between SSBs and CG-PUSCH occasions. In particular, one to one, and/or many to one, and/or one to many mapping between SSBs and CG-PUSCH occasions can be supported and configured as a part of CG-PUSCH configuration.

In one option, only 1 DMRS resource is configured as a part of CG-PUSCH resource. In this case, antennaPort in the CG-PUSCH configuration indicates the DMRS antenna port for the CG-PUSCH transmission.

In some other embodiments, multiple DMRS resources can be configured for a CG-PUSCH occasion. As mentioned above, DMRS resource may include a number of DMRS APs and/or DMRS sequences. The configuration for DMRS APs may reuse or extend the that was defined as MsgA PUSCH. In particular, if DMRS type 1 is configured, 1-bit indication is used to indicate index(-es) of CDM group(s), e.g., bit 0 indicates a first CDM group and bit 1 indicates a second CDM group; if not configured then both CDM groups are used;

If DMRS type 1 is configured, 2-bit indication of index (-es) of CDM group(s), e.g., bit 00 indicates a first CDM group, bit 01 indicates a second CDM group; and bit 10 indicates a third CDM group, bit 11 indicates first and second CDM groups; if not configured then both CDM groups are used; Note that other options to indicate a combination of CDM groups for DMRS APs can be straightforwardly extended.

Further, 1-bit indication is used to indicate port number, e.g., 0 indicates 1 port per CDM group, 1 indicates 2 ports per CDM group, if not configured then 4 ports per CDM group are used;

In addition, if multiple DMRS APs are configured for a CG-PUSCH occasion, DMRS AP or antennaPort in the CG-PUSCH configuration can be used to indicate the start DMRS AP for the association between SSB and CG-PUSCH resource. Alternatively, antennaPort is not configured in the CG-PUSCH configuration. In this case, the first DMRS AP in the indicated multiple DMRS APs is the start DMRS AP for the association between SSB and CG-PUSCH resource.

Figure 8:
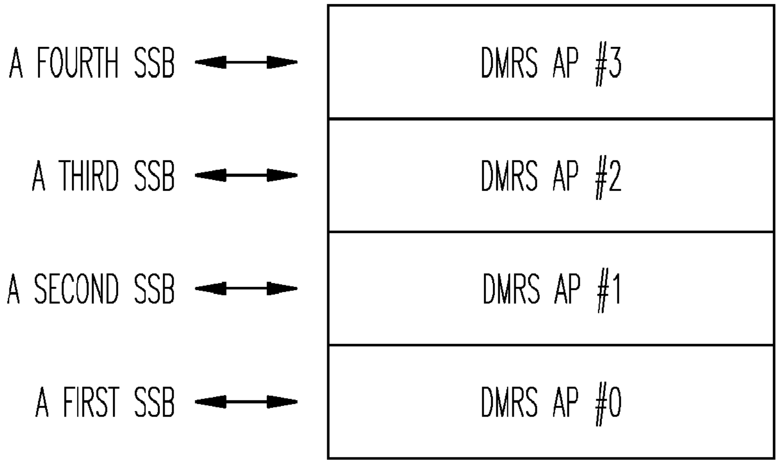
FIG. 8 illustrates an example of association between 4 SSBs and 4 DMRS APs, in accordance with some embodiments

In one example, assuming 4-to-1 mapping is configured for SSB to CG-PUSCH occasion mapping, this indicates that four SSBs are associated with one CG-PUSCH occasion. Further, in the CG-PUSCH configuration, DMRS type 1, 1 DMRS symbol, both DMRS CDM groups are configured, and in each CDM group, two ports are used for DMRS. In this case, DMRS AP with index 0, 1, 2, 3 are used for CG-SDT operation. FIG. 8 illustrates one example of association between 4 SSBs and 4 DMRS APs.

In another embodiment, a mapping ratio is defined between SSBs and CG-PUSCH resources. Similarly, one to one, and/or many to one, and/or one to many mapping between SSBs and CG-PUSCH resources can be supported and configured as a part of CG-PUSCH configuration.

The configured of one or more than one DMRS resources can be defined as mentioned above. Further, similarly, antennaPort can be configured to indicate the start of DMRS AP for the association between SSB and CG-PUSCH resource.

In some embodiments, for RA-SDT, a cell specific PUCCH resource set may be employed for the PUCCH transmission carrying HARQ-ACK feedback of Msg4 for 4-step RACH based SDT and MsgB for 2-step RACH based SDT. Note that a separate pucch-ResourceCommon may be configured for SDT operation compared to conventional 4-step RACH and 2-step RACH procedure, which can help minimize the impact on the legacy system. In case when separate pucch-ResourceCommon is not configured, same pucch-ResourceCommon which is configured for conventional RACH procedure can be applied for HARQ-ACK feedback of Msg4/MsgB for RA-SDT procedure.

In another embodiment, for RA-SDT and/or CG-SDT, a cell specific PUCCH resource set may be employed for the PUCCH transmission carrying HARQ-ACK feedback of subsequent data transmission. In this case, a separate pucch-ResourceCommon may be configured for SDT operation compared to conventional 4-step RACH and 2-step RACH procedure. In case when the separate ResourceCommon is not configured, same pucch-ResourceCommon which is configured for conventional RACH procedure can be applied for HARQ-ACK feedback of subsequent PDSCH transmission during RA-SDT and CG-SDT procedure.

In some other embodiments, a UE specific PUCCH resource set may be configured for a UE for the PUCCH transmission carrying HARQ-ACK feedback of subsequent data transmission. In particular, only PUCCH resource set with UCI size less than 3 bits can be configured for a UE for carrying HARQ-ACK feedback of subsequent PDSCH transmission during RA-SDT and CG-SDT procedure.

In another embodiment, for subsequent data transmission during RA-SDT and CG-SDT procedure, some or all parameters in PDSCH-Config and/or PUSCH-Config may be configured for a UE during RRC release message. In this case, UE should follow the parameters configured by PDSCH-Config and/or PUSCH-Config for PDSCH and PUSCH transmission, which is scheduled by a DCI during RA-SDT and CG-SDT operation. In case when PDSCH-Config and/or PUSCH-Config is not configured, a default value can be applied for the corresponding PDSCH and PUSCH transmission, which is scheduled by a DCI, during RA-SDT and CG-SDT operation.

In another embodiment, if after an integer number of SSB blocks to PUSCH occasions and associated DM-RS resources mapping cycles within the association period, there is a set of PUSCH occasions and associated DM-RS resources that are not mapped to $$N_{PUSCH}^{SS/PBCH}$$

block indexes, no SS/PBCH block indexes are mapped to the set of PUSCH occasions and associated DM-RS resources.

Further, an association pattern period includes one or more association periods and is determined so that a pattern between PUSCH occasions and associated DM-RS resources, and SS/PBCH block indexes repeats at most every 640 msec. PUSCH occasions and associated DM-RS resources that are not associated with SS/PBCH block indexes after an integer number of association periods, if any, are not used for PUSCH transmissions.

If after an integer number of SS/PBCH block indexes to PUSCH occasions and associated DM-RS resources mapping cycles within the association period there is a set of PUSCH occasions and associated DM-RS resources that are not mapped to $$N_{PUSCH}^{SS/PBCH}$$

block indexes, no SS/PBCH block indexes are mapped to the set of PUSCH occasions and associated DM-RS resources. An association pattern period includes one or more association periods and is determined so that a pattern between PUSCH occasions and associated DM-RS resources, and SS/PBCH block indexes repeats at most every 640 msec. PUSCH occasions and associated DM-RS resources that are not associated with SS/PBCH block indexes after an integer number of association periods, if any, are not used for PUSCH transmissions.

Figure 9:
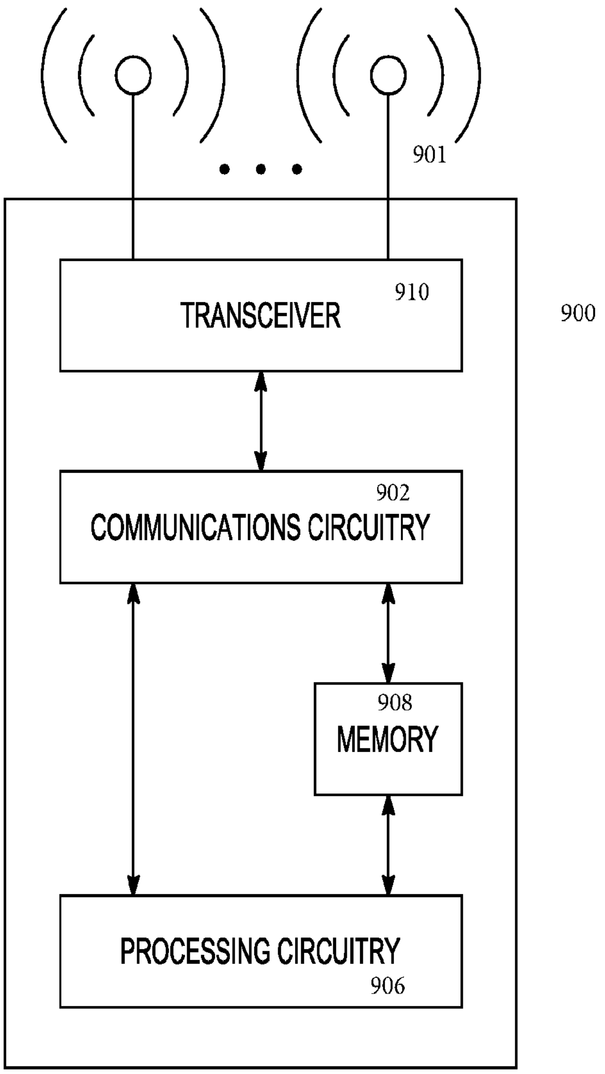
FIG. 9 illustrates a function block diagram of a wireless communication device, in accordance with some embodiments.

FIG. 9 illustrates a functional block diagram of a wireless communication device, in accordance with some embodiments. Wireless communication device 900 may be suitable for use as a UE or gNB configured for operation in a 5G NR network.

The communication device 900 may include communications circuitry 902 and a transceiver 910 for transmitting and receiving signals to and from other communication devices using one or more antennas 901. The communications circuitry 902 may include circuitry that can operate the physical layer (PHY) communications and/or medium access control (MAC) communications for controlling access to the wireless medium, and/or any other communications layers for transmitting and receiving signals. The communication device 900 may also include processing circuitry 906 and memory 908 arranged to perform the operations described herein. In some embodiments, the communications circuitry 902 and the processing circuitry 906 may be configured to perform operations detailed in the above figures, diagrams, and flows.

In accordance with some embodiments, the communications circuitry 902 may be arranged to contend for a wireless medium and configure frames or packets for communicating over the wireless medium. The communications circuitry 902 may be arranged to transmit and receive signals. The communications circuitry 902 may also include circuitry for modulation/demodulation, upconversion/downconversion, filtering, amplification, etc. In some embodiments, the processing circuitry 906 of the communication device 900 may include one or more processors. In other embodiments, two or more antennas 901 may be coupled to the communications circuitry 902 arranged for sending and receiving signals. The memory 908 may store information for configuring the processing circuitry 906 to perform operations for configuring and transmitting message frames and performing the various operations described herein. The memory 908 may include any type of memory, including non-transitory memory, for storing information in a form readable by a machine (e.g., a computer). For example, the memory 908 may include a computer-readable storage device, read-only memory (ROM), random-access memory (RAM), magnetic disk storage media, optical storage media, flash-memory devices and other storage devices and media.

In some embodiments, the communication device 900 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 900 may include one or more antennas 901. The antennas 901 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 900 may include one or more of a keyboard, a display, a non-volatile memory port, multiple antennas, a graphics processor, an application processor, speakers, and other mobile device elements. The display may be an LCD screen including a touch screen.

Although the communication device 900 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 900 may refer to one or more processes operating on one or more processing elements.

EXAMPLES

Example 1 may include a method of wireless communication for a fifth generation (5G) or new radio (NR) system:

detecting, by a UE, a downlink control information (DCI) format 0_0 or 0_1 scrambled by the Cell specific-Radio Network Temporary Identifier (C-RNTI) or a RNTI configured for configured grant small data transmission (CG-SDT); and transmitting, by the UE, a physical uplink shared channel (PUSCH) using a same spatial domain transmission filter in a same active UL bandwidth part (BWP) as a CG-PUSCH transmission;

Example 2 may include the method of example 1 or some other example herein, wherein during CG-SDT, a UE transmits a PUSCH scheduled by a DCI format 0_0 or 0_1 scrambled by the C-RNTI or a RNTI configured for CG-SDT using a same spatial domain transmission filter in a same active UL BWP as a last PUSCH or a physical uplink control channel (PUCCH) transmission carrying HARQ-ACK feedback of a corresponding or last physical downlink shared channel (PDSCH).

Example 3 may include the method of example 1 or some other example herein, wherein during CG-SDT, if the UE detects a DCI format 1_0 or 1_1 with CRC scrambled by the C-RNTI or a RNTI configured for CG-SDT and receives a transport block in a corresponding physical downlink shared channel (PDSCH) or a DCI format 0_0 or 0_1 with CRC scrambled by the C RNTI or a RNTI configured for CG-SDT, the UE may assume same Demodulation reference signal (DM-RS) antenna port quasi co-location properties, as for a SSB block or a channel state information reference signal (CSI-RS) resource the UE used for CG-PUSCH association, regardless of whether or not the UE is provided Transmission Configuration Indicator (TCI)-State for the control resource set (CORESET) where the UE receives the PDCCH with the DCI format 1_0 or 1_1, respectively.

Example 4 may include the method of example 1 or some other example herein, wherein during CG-SDT, a physical uplink control channel (PUCCH) carrying hybrid automatic repeat request-acknowledgement (HARQ-ACK) response of a PDSCH transmission is transmitted with a same spatial domain transmission filter in a same active UL BWP as a CG-PUSCH transmission.

Example 5 may include the method of example 1 or some other example herein, wherein during CG-SDT, PUCCH carrying HARQ-ACK response of a PDSCH transmission is transmitted with a same spatial domain transmission filter in a same active UL BWP as a last PUSCH transmission.

Example 6 may include the method of example 1 or some other example herein, wherein when timing advance timer (TAT) is not expired, UE can provide HARQ-ACK feedback of a PDSCH transmission on PUCCH during RA-SDT and CG-SDT.

Example 7 may include the method of example 1 or some other example herein, wherein during RA-SDT, if the UE detects a DCI format 1_0 or 1_1 with CRC scrambled by the C-RNTI or a RNTI configured for RA-SDT and receives a transport block in a corresponding PDSCH or detects a DCI format 0_0 or 0_1 with CRC scrambled by the C RNTI or a RNTI configured for RA-SDT, the UE may assume same DM-RS antenna port quasi co-location properties, as for a SSB block or a CSI-RS resource the UE used for PRACH association, regardless of whether or not the UE is provided TCI-State for the CORESET where the UE receives the PDCCH with the DCI format 1_0 or 1_1, respectively.

Example 8 may include the method of example 1 or some other example herein, wherein if the UE detects a DCI format 1_0 or 1_1 with CRC scrambled by the C-RNTI or a RNTI configured for RA-SDT and receives a transport block in a corresponding PDSCH or detects a DCI format 0_0 or 0_1 with CRC scrambled by the C RNTI or a RNTI configured for RA-SDT, the UE may assume same DM-RS antenna port quasi co-location properties, as for PDCCH with a DCI format 1_0 with CRC scrambled by RA-RNTI or MsgB-RNTI, regardless of whether or not the UE is provided TCI-State for the CORESET where the UE receives the PDCCH with the DCI format 1_0 or 1_1, respectively.

Example 9 may include the method of example 1 or some other example herein, wherein during RA-SDT, PUCCH carrying HARQ-ACK response of a PDSCH transmission is transmitted with a same spatial domain transmission filter in a same active UL BWP as a PUSCH transmission scheduled by a RAR or fallbackRAR UL grant for 4-step RACH and/or MsgA PUSCH for 2-step RACH or PUCCH with HARQ-ACK feedback of Msg4 or MsgB.

Example 10 may include the method of example 1 or some other example herein, wherein during RA-SDT, PUCCH carrying HARQ-ACK response of a PDSCH transmission is transmitted with a same spatial domain transmission filter in a same active UL BWP as a last PUSCH transmission.

Example 11 may include the method of example 1 or some other example herein, wherein during RA-SDT, a UE transmits a PUSCH scheduled by a DCI format 0_0 or 0_1 scrambled by the C-RNTI or a RNTI configured for RA-SDT using a same spatial domain transmission filter in a same active UL BWP as a Msg3 PUSCH transmission scheduled by a RAR or fallbackRAR UL grant for 4-step RACH and/or MsgA PUSCH for 2-step RACH or PUCCH with HARQ-ACK feedback of Msg4 or MsgB.

Example 12 may include the method of example 1 or some other example herein, wherein a UE transmits a PUSCH scheduled by a DCI format 0_0 or 0_1 scrambled by the C-RNTI or RNTI configured for RA-SDT using a same spatial domain transmission filter in a same active UL BWP as a last PUSCH transmission or PUCCH transmission.

Example 13 may include the method of example 1 or some other example herein, wherein when a set of SSBs are configured by higher layers via RRC signalling for association with CG-PUSCH resource for a CG-PUSCH configuration, if measured RSRP value for a SSB within the set of SSBs does not increase more than the configured RSRP increase threshold or does not decrease more than the configured RSRP decrease threshold, UE can determine the TA is valid for the CG-PUSCH configuration Example 14 may include the method of example 1 or some other example herein, wherein if measured RSRP value for any SSB within the set of SSBs increases more than the configured RSRP increase threshold or decreases more than the configured RSRP decrease threshold, UE can determine the TA is not valid for the CG-PUSCH configuration.

Example 15 may include the method of example 1 or some other example herein, wherein two set of RSRP thresholds can be configured by higher layers via MSI, RMSI (SIB1), OSI or RRC signalling.

Example 16 may include the method of example 1 or some other example herein, wherein assuming the Tx beam used for the transmission of RRC release message is based on the SSB with index A, then if the newly detected SSB index for CG-PUSCH transmission is same as SSB index A, a first set of RSRP thresholds is used to determine whether TA is valid; while if the newly detected SSB index for CG-PUSCH transmission is different from the SSB index A, a second set of RSRP thresholds is used to determine whether TA is valid.

Example 17 may include the method of example 1 or some other example herein, wherein two groups of the SSBs can be configured by higher layers. When the newly detected SSB index for CG-PUSCH transmission is in a first group, a first set of RSRP thresholds is used to determine whether TA is valid; while if the newly detected SSB index for CG-PUSCH transmission is in a second group, a second set of RSRP thresholds is used to determine whether TA is valid.

Example 18 may include the method of example 1 or some other example herein, wherein a PUSCH occasion for CG-SDT is valid if it does not overlap in time and frequency with any PUSCH occasion for 2-step RACH or associated with a Type-2 random access procedure.

Example 19 may include the method of example 1 or some other example herein, wherein when repetition is configured for CG-PUSCH resource, if a repetition in the CG-PUSCH resource does not satisfy the validation rule for CG-PUSCH occasion for CG-SDT, UE does not transmit CG-PUSCH in the repetition; wherein a PUSCH occasion for CG-SDT is invalid only when all the repetitions are invalid.

Example 20 may include the method of example 1 or some other example herein, wherein a PUSCH occasion for CG-SDT is valid only when all the repetitions are valid; wherein if any of the repetitions for CG-PUSCH does not satisfy the validation rule for CG-PUSCH occasion for CG-SDT, UE does not transmit CG-PUSCH with repetitions.

Example 21 may include the method of example 1 or some other example herein, wherein a list of SSB indexes can be configured as part of CG-PUSCH configuration, and a list of DMRS resources including DMRS APs and/or sequences for the configured CG-PUSCH can be associated with the list of SSB index, respectively.

Example 22 may include the method of example 1 or some other example herein, wherein based on the number of configured SSB indexes and the number of CG-PUCSH resources including DMRS APs or sequences, UE can derive the mapping ratio between SSB and CG-PUSCH resource.

Example 23 may include the method of example 1 or some other example herein, wherein a mapping ratio is defined between SSBs and CG-PUSCH occasions, wherein one to one, and/or many to one, and/or one to many mapping between SSBs and CG-PUSCH occasions can be supported and configured as a part of CG-PUSCH configuration.

Example 24 may include the method of example 1 or some other example herein, wherein only 1 DMRS resource is configured as a part of CG-PUSCH resource.

Example 25 may include the method of example 1 or some other example herein, wherein multiple DMRS resources can be configured for a CG-PUSCH occasion, wherein antennaPort in the CG-PUSCH configuration can be used to indicate the start DMRS AP for the association between SSB and CG-PUSCH resource.

Example 26 may include the method of example 1 or some other example herein, wherein a mapping ratio is defined between SSBs and CG-PUSCH resources, wherein one to one, and/or many to one, and/or one to many mapping between SSBs and CG-PUSCH resources can be supported and configured as a part of CG-PUSCH configuration.

Example 27 may include the method of example 1 or some other example herein, wherein for RA-SDT, cell specific PUCCH resource set may be employed for the PUCCH transmission carrying HARQ-ACK feedback of Msg4 for 4-step RACH based SDT and MsgB for 2-step RACH based SDT; wherein a separate pucch-Resource-Common may be configured for SDT operation compared to conventional 4-step RACH and 2-step RACH procedure.

Example 28 may include the method of example 1 or some other example herein, wherein for RA-SDT and/or CG-SDT, cell specific PUCCH resource set may be employed for the PUCCH transmission carrying HARQ-ACK feedback of subsequent data transmission.

Example 29 may include the method of example 1 or some other example herein, wherein UE specific PUCCH resource set may be configured for a UE for the PUCCH transmission carrying HARQ-ACK feedback of subsequent data transmission.

Example 30 may include the method of example 1 or some other example herein, wherein for subsequent data transmission during RA-SDT and CG-SDT procedure, some or all parameters in PDSCH-Config and/or PUSCH-Config may be configured for a UE during RRC release message.

Example 31 includes a method of a user equipment (UE) comprising:

- receiving downlink control information (DCI) that is to schedule a physical uplink shared channel (PUSCH) transmission by the UE, wherein the DCI is scrambled by a cell-specific radio network temporary identifier (C-RNTI) or a RNTI configured for configured grant based small data transmission (CG-SDT) using a spatial domain transmission filter; and
- encoding a PUSCH message for transmission based on the DCI.

Example 32 includes the method of example 31 or some other example herein, wherein the spatial domain transmission filter is common with a spatial domain transmission filter in an active UL bandwidth part (BWP) of a configured grant PUSCH (CG-PUSCH) transmission.

Example 33 includes the method of example 31 or some other example herein, wherein the spatial domain transmission filter is common with a spatial domain transmission filter in an active UL BWP of a previous PUSCH, or a PUCCH transmission carrying HARQ-ACK feedback of a corresponding or previous PDSCH.

Example 34 includes the method of example 31 or some other example herein, further comprising encoding a CG-PUSCH message for transmission prior to encoding the PUSCH message for transmission.

Example 35 includes the method of example 34 or some other example herein, further comprising receiving a physical downlink control channel (PDCCH) with an uplink (UL) grant to schedule the PUSCH transmission.

Example 36 includes the method of example 35 or some other example herein, wherein a transmission (Tx) beam used for the PUSCH transmission is common with a TX beam used for the CG-PUSCH transmission.

Example 37 includes the method of example 31 or some other example herein, further comprising:

- receiving, subsequent to the PUSCH transmission, a PDCCH with UL grant to schedule a PUSCH retransmission; and
- encoding the PUSCH message for retransmission based on the PDCCH.

Example 38 includes the method of example 37 or some other example herein, wherein a Tx beam used the PUSCH retransmission is common with a Tx beam used for the PUSCH transmission or previous PUSCH transmission.

Example 39 includes a method of a user equipment (UE) comprising:

- encoding a CG-PUSCH message for transmission to a next-generation NodeB (gNB);
- receiving, from the gNB, a PDCCH with DL grant and a corresponding PDSCH; and
- encoding a PUCCH message for transmission to the gNB that carries an indication of HARQ-ACK feedback of the PDSCH.

Example 40 includes the method of example 39 or some other example herein, wherein

- wherein the PUCCH is transmitted using a common spatial domain transmission filter with a CG-PUSCH transmission.

Example 41 includes the method of example 40 or some other example herein, wherein the PDCCH includes DCI with a CRC scrambled by C-RNTI or a RNTI configured for CG-SDT to indicate HARQ-ACK feedback of a corresponding CG-PUSCH transmission.

Example 42 includes the method of example 41 or some other example herein, further comprising determining demodulation reference signal (DMRS) antenna port quasi co-location properties that are common with an SSB block or a CSI-RS resource the UE used for a CG-PUSCH association.

Example 43 includes the method of example 40 or some other example herein, wherein the DCI is DCI format 1_0 or 1_1 with a CRC scrambled by the C-RNTI or a RNTI configured for RA-SDT.

Example 44 includes a method of a user equipment (UE) comprising:

- receiving CG-PUSCH configuration information that includes a list of SSB indexes and a list of DMRS resources associated with the list of SSB indexes; and
- deriving a mapping ratio between an SSB and a CG-PUSCH resource based on the CG-PUSCH configuration information.

Example 45 includes the method of example 44 or some other example herein, wherein the list of DMRS resources includes an indication of DMRS APs or sequences for configured CG-PUSCH.

Example 46 includes the method of example 44 or some other example herein, wherein the mapping ratio is defined between SSBs and CG-PUSCH occasions.

Example 47 includes the method of example 46 or some other example herein, wherein the mapping ratio is a one to one, many to one, or one to many mapping between SSBs and CG-PUSCH occasions.

Example 48 includes the method of example 44 or some other example herein, wherein a single DMRS resource is configured as a part of the CG-PUSCH resource.

Example 49 includes the method of example 44 or some other example herein, wherein multiple DMRS resources are configured for a CG-PUSCH occasion.

Example 50 includes the method of example 46 or some other example herein, wherein an antenna port indicator in the CG-PUSCH configuration information is to indicate a starting DMRS AP for an association between an SSB and CG-PUSCH resource.

Example 51 may include the method of example 39 or some other example herein, wherein a cell-specific PUCCH resource set for RA-SDT is employed for the PUCCH transmission.

Example 52 includes the method of example 51 or some other example herein, wherein the PUCCH transmission includes an indication of HARQ-ACK feedback of Msg4 for 4-step RACH based SDT and MsgB for 2-step RACH based SDT.

Example 53 includes the method of example 39 or some other example herein, wherein a cell-specific PUCCH resource set for RA-SDT or CG-SDT is employed for the PUCCH transmission, and the PUCCH transmission includes an indication of HARQ-ACK feedback of a subsequent data transmission.

Example 54 may include the method of example 39 or some other example herein, wherein a UE specific PUCCH resource set is configured for the UE for the PUCCH transmission.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for a user equipment (UE) configured for operation in a fifth-generation new radio (5G-NR) system, the apparatus comprising: processing circuitry; and memory, wherein for a configured-grant (CG) based physical uplink shared channel (PUSCH) (CG-based PUSCH) transmission in a Radio Resource Control (RRC) inactive (RRC_INACTIVE) state, the processing circuitry is configured to:

decode a physical downlink control channel (PDCCH) reception to detect a downlink control information (DCI) format, wherein when a DCI format for a configured grant (CG) based small data transmission (SDT) (CG-SDT) is detected scheduling the CG-based PUSCH transmission and a transport block (TB) is received in a corresponding physical downlink shared channel (PDSCH) reception, determine, based on the DCI format, that a demodulation reference signal (DM-RS) antenna port associated with the PDCCH reception and a DM-RS antenna port associated with the PDSCH reception are quasi co-located (QCL) with a synchronization signal/physical broadcast channel (SS/PBCH) associated with a physical uplink shared channel (PUSCH) resource for the CG-SDT;

configure the UE to transmit the CG-based PUSCH transmission that was scheduled by the DCI format, without a PRACH preamble, in the PUSCH resource for the CG-SDT while the UE is in the RRC INACTIVE state; and configure the UE to transmit a physical uplink control channel (PUCCH) with HARQ-ACK information associated with the PDSCH reception, wherein the processing circuitry is to configure the UE to use a same spatial domain transmission filter for transmission of the PUCCH that was used by the UE for as a last PUSCH transmission when the processing circuitry has determined that the DM-RS antenna port associated with the corresponding PDCCH reception and the DM-RS antenna port associated with the PDSCH reception are QCL with the SS/PBCH associated with the PUSCH resource for the CG-SDT, and wherein the memory is configured to store parameters for the spatial domain transmission filter.

2. The apparatus of claim 1, wherein the DCI format that is detected comprises a DCI format 1_0 for the CG-SDT.

3. The apparatus of claim 2, wherein the processing circuitry is further configured to:

decode a CG-PUSCH configuration that indicates a number of SS/PBCH block indexes to map to valid PUSCH occasions and associated DM-RS resources for transmission of the PUSCH; and map the number of SS/PBCH block indexes to the valid PUSCH occasions and associated DM-RS resources first in increasing order of a DM-RS port index and second in increasing order of a DM-RS sequence index.

4. The apparatus of claim 3, wherein when there is a set of PUSCH occasions and associated DM-RS resources that are not mapped to the SS/PBCH block indexes after an integer number of SS/PBCH block indexes to PUSCH occasions and associated DM-RS resources mapping cycles within an association period, the processing circuitry is to refrain from further mapping the SS/PBCH block indexes to the set of PUSCH occasions and associated DM-RS resources.

5. The apparatus of claim 4, wherein the association period is determined so that a pattern between the PUSCH occasions and associated DM-RS resources, and the SS/PBCH block indexes repeats at most every 640 msec.

6. The apparatus of claim 4, wherein the DM-RS antenna port associated with PDCCH receptions and the DM-RS antenna port associated with PDSCH receptions are determined to be QCL with the SS/PBCH associated with the PUSCH with respect to average gain and Type D properties including a spatial receiver (RX) parameter.

7. The apparatus of claim 6, wherein when the processing circuitry determines that the DM-RS antenna port associated with PDCCH receptions and the DM-RS antenna port associated with PDSCH receptions are QCL with the SS/PBCH associated with the PUSCH resource for the CG-SDT, the processing circuitry is further configured to apply same spatial receive (RX) parameters for synchronization signal block (SSB) receptions, PDCCH receptions and PDSCH receptions.

8. The apparatus of claim 7, wherein to apply the same spatial RX parameters, the processing circuitry is configured to:

demodulate a PDSCH using a DM-RS based on the DM-RS antenna port associated with PDSCH reception being QCL with the SS/PBCH associated with the PUSCH resource for the CG-SDT; and demodulate a PDCCH using a DM-RS based on the DM-RS antenna port associated with PDCCH reception is being QCL with the SS/PBCH associated with the PUSCH resource for the CG-SDT.

9. The apparatus of claim 1, wherein the processing circuitry comprises a baseband processor, and wherein the processing circuitry is configured to encode the CG-based PUSCH transmission for transmission using the same spatial domain transmission filter as the last PUSCH transmission using two or more antennas.

10. A non-transitory computer-readable storage medium that stores instructions for execution by processing circuitry of a user equipment (UE) configured for operation in a fifth-generation new radio (5G-NR) system, wherein for a configured-grant (CG) based physical uplink shared channel (PUSCH) (CG-based PUSCH) transmission in a Radio Resource Control (RRC) inactive (RRC_INACTIVE) state, the processing circuitry is configured to:

decode a physical downlink control channel (PDCCH) reception to detect a downlink control information (DCI) format, wherein when a DCI format for a configured grant (CG) based small data transmission (SDT) (CG-SDT) is detected scheduling the CG-based PUSCH transmission and a transport block (TB) is received in a corresponding physical downlink shared channel (PDSCH) reception, determine, based on the DCI format, that a demodulation reference signal (DM-RS) antenna port associated with the PDCCH reception and a DM-RS antenna port associated with the PDSCH reception are quasi co-located (QCL) with a synchronization signal/physical broadcast channel (SS/PBCH) associated with a physical uplink shared channel (PUSCH) resource for the CG-SDT;

configure the UE to transmit the CG-based PUSCH transmission that was scheduled by the DCI format, without a PRACH preamble, in the PUSCH resource for the CG-SDT while the UE is in the RRC INACTIVE state; and configure the UE to transmit a physical uplink control channel (PUCCH) with HARQ-ACK information associated with the PDSCH reception, wherein the processing circuitry is to configure the UE to use a same spatial domain transmission filter for transmission of the PUCCH that was used by the UE for as a last PUSCH transmission when the processing circuitry has determined that the DM-RS antenna port associated with the corresponding PDCCH reception and the DM-RS antenna port associated with the PDSCH reception are QCL with the SS/PBCH associated with the PUSCH resource for the CG-SDT.

11. The non-transitory computer-readable storage medium of claim 10, wherein the DCI format that is detected comprises a DCI format 1_0 for the CG-SDT.

12. The non-transitory computer-readable storage medium of claim 11, wherein the processing circuitry is further configured to:

decode a CG-PUSCH configuration that indicates a number of SS/PBCH block indexes to map to valid PUSCH occasions and associated DM-RS resources for transmission of the PUSCH; and map the number of SS/PBCH block indexes to the valid PUSCH occasions and associated DM-RS resources first in increasing order of a DM-RS port index and second in increasing order of a DM-RS sequence index.

13. The non-transitory computer-readable storage medium of claim 12, wherein when there is a set of PUSCH occasions and associated DM-RS resources that are not mapped to the SS/PBCH block indexes after an integer number of SS/PBCH block indexes to PUSCH occasions and associated DM-RS resources mapping cycles within an association period, the processing circuitry is to refrain from further mapping the SS/PBCH block indexes to the set of PUSCH occasions and associated DM-RS resources.

14. The non-transitory computer-readable storage medium of claim 13, wherein the association period is determined so that a pattern between the PUSCH occasions and associated DM-RS resources, and the SS/PBCH block indexes repeats at most every 640 msec.

15. The non-transitory computer-readable storage medium of claim 13, wherein the DM-RS antenna port associated with PDCCH receptions and the DM-RS antenna port associated with PDSCH receptions are determined to be QCL with the SS/PBCH associated with the PUSCH with respect to average gain and Type D properties including a spatial receiver (RX) parameter.

* * * * *